United States Patent Office 3,305,773
Patented Feb. 21, 1967

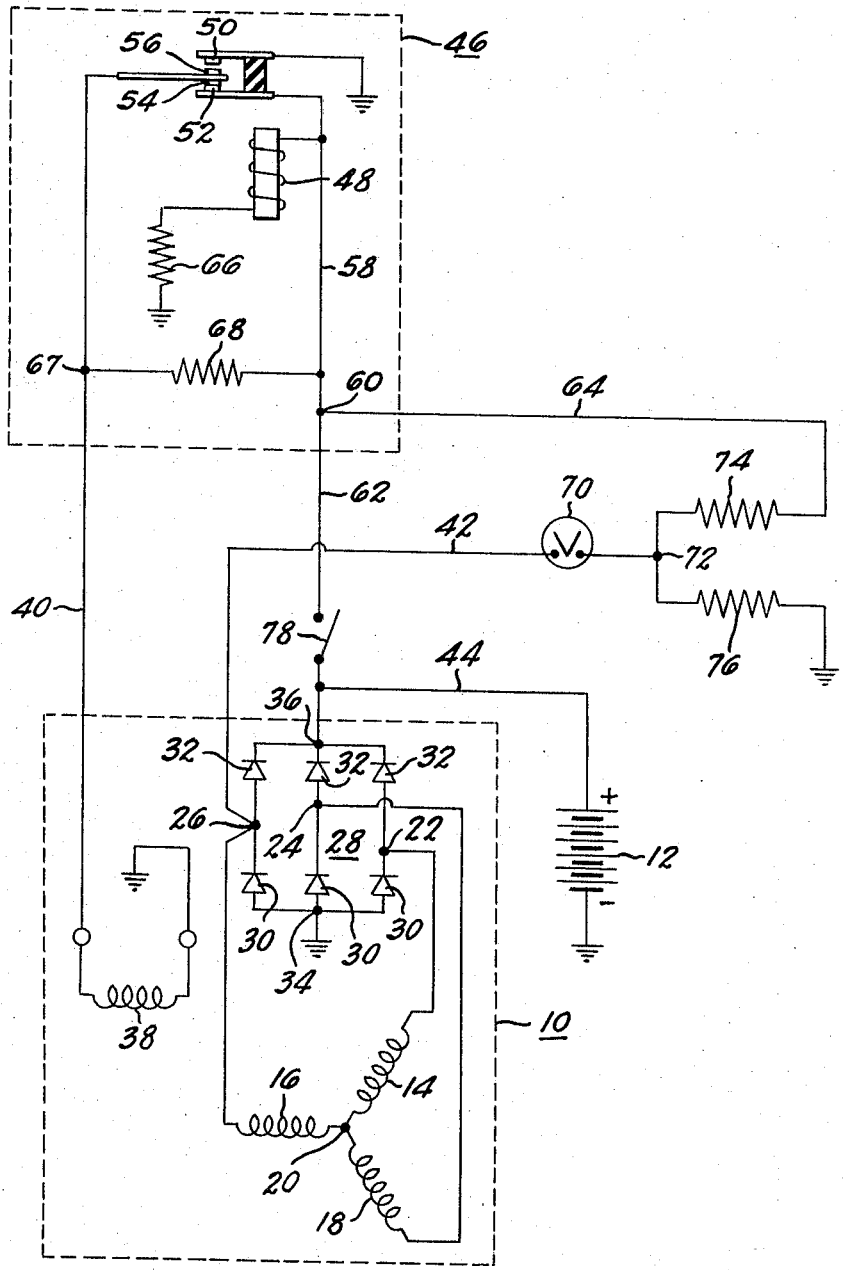

3,305,773
FAILURE INDICATING SYSTEM FOR DIODE RECTIFIED ALTERNATING CURRENT GENERATORS UTILIZING A COMPARISON OF VOLTAGES
Allen E. Beaty, Anderson, Ind., assignor to General Motors Corporation, Detroit, Mich., a corporation of Delaware
Filed Aug. 12, 1964, Ser. No. 389,050
6 Claims. (Cl. 324—51)

This invention relates to systems for indicating failures in an electrical system that is powered by a diode-rectified alternating current generator.

In the past, it has been common practice to provide signal lights for indicating failures in electrical systems that are supplied by diode-rectified alternating current generators. Typical systems of this type are illustrated in the patent to Raver, 2,817,830, and in the patent to Carlson, 3,037,124. In these systems, a relay is provided which controls a signal lamp circuit and the relay responds to the output voltage of the alternator-rectifier power unit.

In contrast to the systems disclosed in the Raver and Carlson patents mentioned above, it is an object of this invention to provide a failure indicating system which responds to two voltages, one of which is provided by a conductor connected with at least one of the phase windings of the alternating current generator and the other of which is related to system voltage.

Another object of this invention is to provide a failure indicating system for a diode-rectified alternator wherein an indicator such as a voltmeter is connected between two junctions, one of which is at substantially one-half system voltage and the other of which responds to voltages appearing at one of the phase windings of the alternating current generator.

Still another object of this invention is to provide a failure indicating system for a diode rectified alternating current generator wherein an indicator such as a voltmeter is connected between two potential points, one of which is at substantially one-half system voltage and the other of which is connected between two diodes of a three phase full wave bridge rectifier.

Further objects and advantages of the present invention will be apparent from the following description, reference being had to the accompanying drawings wherein preferred embodiments of the present invention are clearly shown.

In the drawings:

The single figure drawing is a schematic circuit drawing of a failure indicating system made in accordance with this invention.

Referring now to the drawing, the reference numeral 10 generally designates a power unit for supplying direct current to electrical loads on a motor vehicle such as the battery 12. The power unit 10 is a diode-rectified alternating current generator and includes an alternating current generator which has a three phase Y-connected output winding comprised of phase windings 14, 16 and 18. The phase windings are connected together at the neutral 20 and are also connected with the A.C. input terminals 22, 24 and 26 of a three phase full-wave bridge rectifier network generally designated by reference numeral 28. This bridge rectifier network is made up of diodes 30 and 32 which are preferably silicon diodes. The diodes 30 have their anodes connected with one of the D.C. output terminals 34 of the bridge rectifier which is grounded. The cathodes of the diodes 32 are connected to the other D.C. output terminal 36 of the bridge rectifier 28.

The alternating current generator has a field winding 38, one side of which is grounded. The opposite side of the field winding 38 is connected with a conductor 40.

The A.C. input terminal 26, which is connected with phase winding 16, is connected with a lead wire 42. The D.C. output terminal 36 of the bridge rectifier 28 is connected with conductor 44 which is connected to the positive side of the battery 12.

The electrical system includes a voltage regulator generally designated by reference numeral 46. This regulator is illustrated as being of the vibrating contact type but it is understood that it could take other forms and might be of the transistor type. The regulator 46 includes a relay coil 48 and movable contacts 50 and 52 which cooperate with fixed contacts 54 and 56. The contacts 50 and 52 move together but are insulated from each other. The contact 50 is grounded while the contact 52 is connected with conductor 58. The conductor 58 is connected with junction 60 which is connected with conductors 62 and 64. One side of the relay coil 48 is grounded through resistor 66 and the opposite side of the relay coil is connected to conductor 58. The fixed contacts 54 and 56 are connected to junction 67 which is connected to conductor 40. A resistor 68 is connected between conductor 58 and junction 67.

The electrical system includes an indicator designated by reference numeral 70 and this indicator in the form illustrated is a voltmeter. One side of the voltmeter is connected with conductor 42 and the opposite side of the voltmeter is connected with a junction 72. A resistor 74 is connected between junction 72 and conductor 64. Another resistor 76 is connected between junction 72 and ground.

It is desired that the junction 72 have a potential which is approximately one-half the potential appearing between conductor 44 and ground or in other words, one-half of the system voltage. To accomplish this, the resistors 74 and 76 have the same resistance and therefore form a voltage divider that provides substantially one-half system voltage at junction 72.

The conductor 44 can be connected with conductor 62 by the closure of a switch 78. This switch can be a manually operable type or could be the contents of a field relay which would be controlled by a manually operable switch.

In explaining the operation of the failure indicating system of this invention, it will be appreciated that the voltage regulator 46 will maintain the output voltage of the diode-rectified alternating current generator 10 substantially constant so that the voltage appearing between conductor 44 and ground will be held at some substantially constant value, for example, 14 volts in a twelve volt system. The voltage appearing between conductor 44 and ground is impressed across the voltage divider 74 and 76 through closed switch 78, conductor 62, junction 60, conductor 64, and then through resistors 74 and 76 to ground. Since resistors 74 and 76 have substantially identical resistance values, the junction 72 will under all conditions have a potential which is substantially one-half the voltage appearing between conductor 44 and ground. This voltage is applied to one side of the voltmeter 70.

The voltage which is applied to the opposite side of the voltmeter 70 is the voltage appearing between junction 26 and ground. Under normal operating conditions, where the diode-rectified alternating current generator has no failures, this voltage will be approximately one-half system voltage so that equal potentials are applied to opposite sides of the voltmeter 70. The voltmeter 70 is preferably arranged to have a pointer that is in a vertical position when there is no difference in potential across it to thereby indicate that the generating system is in proper operating condition. A deflection of the pointer to the left or to the right from a vertical position indicates a malfunction in the system and this deflection would take place whenever the potential of junction 72 and conductor 42 are not equal. The face of the voltmeter can carry various indicia which will indicate to the operator of the vehicle that there is a malfunction in the system when the pointer deflects in one direction or the other from the vertical position.

The potential of conductor 42 will vary from one-half system voltage when certain malfunctions occur. For example, if one of the diodes 32 should become shorted, the potential of junction 26 will increase above one-half system voltage causing an unbalance in potential between conductor 42 and junction 72 and therefore a deflection of the voltmeter 70. Various other malfunctions such as the shorting of other diodes or the opening of certain diodes will also be indicated by a change in voltage of the conductor 42.

It will be appreciated that the indicator 70 might take various other forms than the voltmeter illustrated. As an example, the voltmeter could be of the contact type wherein movement of the pointer causes the closure of an electrical circuit that is connected with a signal lamp. The voltmeter 70 could be replaced by a relay coil which would control the opening and closing of contacts connected with a signal lamp. In addition, the pointer of the voltmeter could move a shutter element having windows of red and green color which would move past a signal light to indicate a malfunction in the system. It is intended that the term "indicator" as used in the specification and claims cover the voltmeter 70 and any devices that are capable of being connected between conductor 42 and junction 72 and respond to an unbalance in voltage.

Although the conductor 42 is illustrated as being connected to junction 26, it has been found that the indicating system of this invention will be operable if the conductor 42 is connected to the neutral 20 of the three phase output winding.

While the embodiments of the present invention as herein disclosed, constitute a preferred form, it is to be understood that other forms might be adopted.

What is claimed is as follows:

1. A malfunction indicating system for an electrical system that is powered by a diode-rectified alternating generator comprising, an alternating current generator having a three phase output winding, a three phase full-wave bridge rectifier connected with said output winding, a battery, means connecting said battery across the D.C. output terminals of said bridge rectifier, a voltage dividing network connected across the D.C. output terminals of said bridge rectifier network and across said battery, said voltage dividing network including a first reference potential point, means connected with said output winding providing a second reference potential point, said voltage dividing network being so proportioned that said first and second reference potential points have substantially equal potentials when said alternator and bridge rectifier are operating normally, and an indicator connected between said first and second reference potential points, said indicator being capable of indicating a condition where the potentials of said first and second reference potential points are not equal.

2. The indicating system according to claim 1 where the second reference potential point is connected with one of the A.C. input terminals of the bridge rectifier network.

3. The indicating system according to claim 1 where the indicator is a voltmeter.

4. A malfunction indicating system for an electrical system that is powered by a diode-rectified alternator comprising, an alternating current generator having a three phase output winding and a field winding, a three phase full-wave bridge rectifier network connected with said output winding having a pair of D.C. output terminals, a battery, means connecting said battery across the D.C. output terminals of said bridge rectifier, a voltage divider connected across the D.C. output terminals of said bridge rectifier and across said battery, said voltage divider including two resistors having substantially equal resistance, said resistors having a common junction forming a first reference potential point, means connected with said output winding providing a second reference potential point, the potential of said first and second reference potential points being substantially equal when said alternating current generator and bridge rectifier are operating normally, and an indicating means connected between said first and second reference potential points, said indicating means being capable of indicating a condition where the potentials of said first and second reference potential points are not equal.

5. The indicating system according to claim 4 where the second reference potential point is connected to one of the A.C. input terminals of the bridge rectifier.

6. The electrical system according to claim 4 where a voltage regulating means is provided connected with the field winding of the alternating current generator for maintaining the output voltage of the generator substantially constant.

References Cited by the Examiner

UNITED STATES PATENTS

| | | | |
|---|---|---|---|
| 3,094,652 | 6/1963 | Zoppi et al. | 322—99 X |
| 3,210,727 | 10/1965 | McLaughlin et al. | 340—249 X |
| 3,217,311 | 11/1965 | Custer et al. | 340—249 |
| 3,241,030 | 3/1966 | Oster | 322—99 X |
| 3,244,900 | 4/1966 | Colvill | 322—99 X |

WALTER L. CARLSON, *Primary Examiner.*

G. R. STRECKER, *Assistant Examiner.*